United States Patent [19]

Hoover et al.

[11] Patent Number: 4,461,382

[45] Date of Patent: Jul. 24, 1984

[54] MOTION DETECTOR AND CONTROL SYSTEM FOR AN ACCUMULATING LIVE CONVEYOR

[75] Inventors: Alan A. Hoover, New Palestine; Richard D. Harris, Fountaintown, both of Ind.

[73] Assignee: Pentek Corporation, Indianapolis, Ind.

[21] Appl. No.: 321,569

[22] Filed: Nov. 16, 1981

[51] Int. Cl.³ .............................................. B65G 13/07
[52] U.S. Cl. ................................................... 198/781
[58] Field of Search ............... 198/502, 781, 577, 783, 198/460, 789, 790

[56] References Cited

U.S. PATENT DOCUMENTS

| | | | |
|---|---|---|---|
| 3,130,394 | 4/1964 | Hinz | 198/502 |
| 3,537,568 | 11/1970 | Leach | 198/781 |
| 4,174,777 | 11/1979 | Riehle | 198/781 |
| 4,361,224 | 11/1982 | Bowman | 198/781 |

Primary Examiner—Jeffrey V. Nase
Attorney, Agent, or Firm—Barnes & Thornburg

[57] ABSTRACT

An accumulating live conveyor comprises a plurality of load-carrying rollers supported for rotation about transverse axes, a power-driven belt for engaging the load-carrying rollers to convey loads from the upstream end toward the downstream end of the conveyor, conveyor assembly sections operable for disengaging the power-driven belt from the load-carrying rollers to accumulate loads on the load-carrying rollers in selected upstream and downstream areas of the conveyor, and a control system providing area control and load motion control of the conveyor. The control system comprises an apparatus for detecting the position of the leading load conveyed into a downstream area of the conveyor and for disengaging the power-driven belt in the downstream area, a circuit responsive to the detecting apparatus for producing a load position-related signal, an apparatus for sensing motion of at least the leading load in relation to its detected position and for producing a load motion-related signal, and a circuit responsive to the load position-related signal for processing the load motion-related signal and for producing a control signal which is used to disengage the power-driven belt in the upstream area of the conveyor.

11 Claims, 5 Drawing Figures

MOTION DETECTOR AND CONTROL SYSTEM FOR AN ACCUMULATING LIVE CONVEYOR

The present invention relates to a live conveyor which is power-operated to effect transportation of loads over a series of rollers from an upstream end to a downstream end without gravity assistance. More particularly, the invention relates to an accumulating live conveyor and a system for detecting and controlling load motion in selected areas of the conveyor.

Accumulating live conveyors are generally well known to those skilled in the art. In general, a live conveyor is defined as a conveyor having a driving unit for propelling an endless conveying means which, through frictional contact with either a plurality of load-carrying rollers or with a load, transports the load from an upstream end to a downstream end of the conveyor without the assistance of gravity. An accumulating live conveyor includes means for disengaging the endless conveying means from the load-carrying rollers or load in selected areas of the conveyor to stop movement of the load on the load-carrying rollers without stopping or interfering with the operation of the driving unit or endless conveying means. With an accumulating live conveyor, a quantity of loads can be accumulated in a selected area of the conveyor before being moved further downstream or before being removed from the conveyor. Accumulated loads are typically butted-up against each other to form a continuous line of loads in a selected accumulating area of the conveyor.

For many operations of a live conveyor, it is desirable to separate either a single load or a combination of loads from the downstream end of a line of loads accumulated in a selected area of the conveyor. This conveyor function is commonly referred to as "load separation." The function of "load separation" is controlled by driving either the load-carrying rollers or the loads in selected areas of the conveyor to convey some of the loads toward the downstream end of the conveyor and by disengaging the endless conveying means in other selected areas of the conveyor to stop other loads in a position on the load-carrying rollers. In general, the driving function is controlled by dividing the conveyor into areas and raising and lowering the conveying means in selected areas to engage and disengage the load-carrying rollers or loads respectively in such areas, and further by utilizing individual brakes to stop rotation of the load-carrying rollers in discrete locations of the conveyor.

There are various types of "load separation" control techniques. Each of these techniques has heretofore required the critical placement of one or more photoelectric switching devices in each selected area of the conveyor. When the first load conveyed toward the downstream end of the conveyor reaches a first "accumulate" photoelectric switching device, a first downstream area of the conveyor is placed into an accumulate mode of operation to stop the first load in a position on the load-carrying rollers in such area. Additional loads may continue to be conveyed in other upstream areas of the conveyor and accumulate in the downstream accumulating area. A "full" condition of the downstream accumulating area is indicated when the first load is pushed further downstream and reaches a "full" photoelectric switching device. When the downstream accumulating area is indicated as being full, an appropriate signal may be sent to either deactivate the conveyor or place an upstream area of the conveyor in an accumulating mode of operation. A "load call" switch may be provided for overriding one or both of the photoelectric switching devices to allow loads to be "separated" from the downstream accumulating area of the conveyor. One of the problems associated with the use of "accumulate" and "full" photoelectric switching devices which detect the position of the leading or first load is that the spacing between such devices is very critical. Furthermore, the photoelectric switching devices are subject to false indications of "accumulate" or "full" conditions as a result of improper placement or positioning of the leading load.

Another desirable reason for controlling the accumulation of loads in selected areas of the conveyor is to increase the efficiency of operation of the conveyor by providing a maximum conveyor length for a minimum of power to drive the endless conveying means. The maximum length of a conveyor that can be driven by a single motor-reducer mechanism (drive package) is a function of (1) the total accumulative load weight on the conveyor and (2) how much of the accumulative load weight is being driven or moved over the load-carrying rollers at one time. Using a 1 (one) horsepower motor, the maximum length of conveyor which can be driven without controlling selected areas of the conveyor is 45 feet (13.716 meters). This maximum length is based upon an accumulated load weight of 150 pounds per linear foot. By controlling selected areas of the conveyor, the maximum length of the conveyor for the same 1 (one) horsepower motor can be increased to 70 feet (21.306 meters). Area control is intended to refer to the ability to remove driving engagement of the endless conveying means from the load-carrying rollers or loads in selected areas of the conveyor to reduce the total accumulated load weight being driven by the motor at one time.

Heretofore, critical placement of photoelectric switching devices in proximity to the end of each area to be controlled has been necessary in order to provide area control capability for a conveyor. In order to control three areas of a conveyor, it has been necessary to use one "accumulate" photoelectric switching device positioned at the downstream end of the conveyor system and one "full" switching device for each accumulating area, for a total of four photoelectric switching devices.

It is therefore one object of the present invention to provide a control system for an accumulating live conveyor which senses motion of a leading load at the downstream end of a selected area of the conveyor to control the "load separation" function of the conveyor.

Another object of the present invention is to provide a control system for an accumulating live conveyor which requires only one photoelectric sensing device located in proximity to the downstream end of the conveyor in order to control one or more selected areas of the conveyor, thereby to maximize the length of the conveyor, and the number of motion detectors required equals the number of areas to be controlled minus one.

A further object of the present invention is to provide a control system for an accumulating live conveyor which senses motion of the leading load in a selected area of the conveyor to provide a more direct indication of a "load separation" or "full" condition.

Still another object of the present invention is to provide a system for controlling the operation of an accumulating live conveyor which detects a position of a leading load in a selected area, and thereafter senses motion of the load to control further movement of the load and to control other upstream areas of the conveyor.

These and other objects of the present invention are satisfied by providing a system for controlling the operation of an accumulating live conveyor which includes a photoelectric switching device for detecting the position of a leading load in a selected area of the conveyor and for providing a load position-related signal, an accumulation assembly responsive to the load position-related signal for removing during engagement of the driving means in the selected area, a motion detector in contact with load-carrying rollers beneath the load for sensing motion of the load in relation to its detected position and for providing a load motion-related signal, and a signal processor responsive to the load position-related signal for processing the load motion-related signal and for producing a signal for controlling the operation of the conveyor.

Other objects and advantages of the present invention will become apparent in view of the following detailed description of one embodiment thereof exemplifying the best mode of carrying out the invention as presently perceived, which description should be considered in conjunction with the accompanying drawings, in which.

Figure 1:
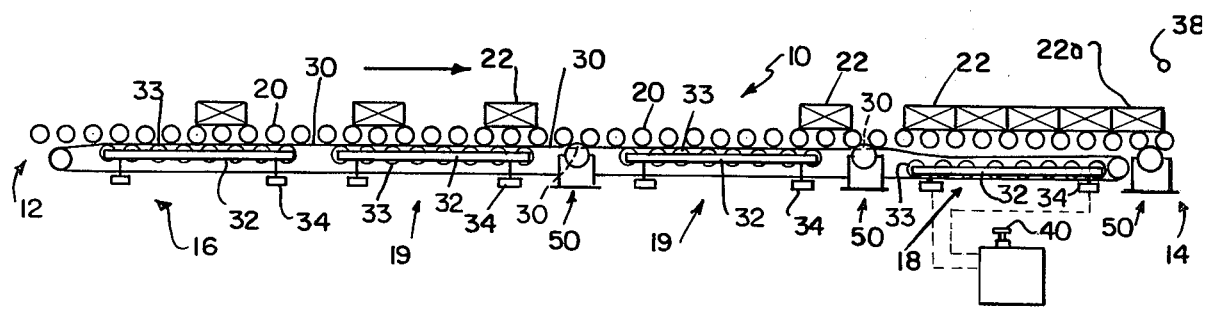
FIG. 1 is a diagrammatic view of an accumulating live conveyor including a system of motion detectors embodying the present invention for sensing load motion in selected areas of the conveyor.

Referring to FIG. 1, an accumulating live roller conveyor 10 includes an upstream end 12 and a downstream end 14 with an upstream accumulating area 16, a downstream accumulating area 18, and one or more intermediate accumulating areas 19. A plurality of load-carrying rollers 20 are supported for rotation about transverse axes. The load-carrying rollers 20 are suitably spaced apart and arranged in a common load-transporting array to transport loads 22 in a longitudinal direction, as indicated by the arrow in FIG. 1, between the upstream end 12 and the downstream end 14 over the accumulating areas 16, 18, and 19.

The live conveyor 10 is power-driven by an endless driving or conveying means 30 which is held against the load-carrying rollers 20 to propel the rollers 20. In the preferred embodiment, the endless conveying means 30 is a flexible belt formed of suitable material so as to develop frictional contact with the peripheral surfaces of the load-carrying rollers 20. The endless conveying means 30 may also be a rope, chain, etc., which is formed of a material similar to that of the belt. Furthermore, the endless conveying means 30 may directly contact the loads 22 to propel them over the load-carrying rollers 20 through direct frictional contact therewith. The endless driving means 30 is propelled by a suitable propelling means generally located beneath the load-carrying rollers 20 and including a suitable motor at one of the upstream 12 and downstream 14 ends and a take-up roller located at the other of the upstream 12 and downstream 14 ends.

The endless driving means 30 is engaged in frictional contact with the load-carrying rollers 20 by individual accumulating assembly sections 32 associated with each accumulating area 16, 18, and 19 of the conveyor 10. Each accumulating assembly section 32 supports a plurality of pressure rollers 33 for carrying the upper power-delivering or frictional-contact pass of the endless driving means 30. In the driving position of an assembly section 32, the upper frictional contact pass of the endless conveying means 30 is captured between the pressure rollers 33 and the load-carrying rollers 20 to effect rotation of the load-carrying rollers and propel loads 22 over the conveyor 10. Each assembly section 32 is raised and lowered by inflatable air bags 34. Air bags 34 are operable by solenoids (reference numerals 36a and 36b in FIG. 4) to raise and lower the assembly sections 32 in the accumulating areas 16, 18, and 19 to accumulate loads in one or more selected areas 16, 18, or 19. In an accumulating mode of operation, an assembly section 32 is lowered, as shown in downstream accumulating area 18 in FIG. 1, to disengage the frictional contact between the endless driving means 30 and the load-carrying rollers 20. Lowering of an assembly section 32 in a selected area, such as area 18, occurs without interrupting the operation of the endless conveying means 30 so that loads 22 continue to be transported in other areas 16 and 19 of the conveyor. Loads 22 in the selected area 18 stop in a position on the load-carrying rollers 20. If the first load 22a in the selected area 18 is stopped in a position at the end of such area, additional loads 22 will be sequentially pushed onto the selected area 18 as they are transported over the other upstream areas 16 and 19 until they butt-up against the first load 22a.

A system embodying the present invention for controlling load separation and area accumulation of loads on an accumulating live conveyor 10 includes one photoelectric switch 38 positioned at the downstream end 14 of the conveyor 10. Initially, all assembly sections 32 are in raised positions so that the endless driving means 30 frictionally contact the load-carrying rollers 20 in each area 16, 18, and 19 of the conveyor 10. When the first load 22a reaches the location of the photoelectric switch 38, the switch 38 provides a signal to the solenoid (36a in FIG. 4) associated with the assembly section 32 in the downstream accumulating area 18. Air bags 34 (34a in FIG. 4) in area 18 are deflated to lower assembly section 32 and remove driving contact of the endless driving means 30 with respect to the load-carrying rollers 20 in area 18. The first load 22a therefore stops in its position on the conveyor 10. Additional loads 22 are pushed onto the area 18 by the driven load-carrying rollers 20 in the upstream and intermediate areas 16 and 19, respectively, until the downstream area 18 becomes full, as shown in FIG. 1. A load call switch 40 may be provided for overriding the signal produced by the photoelectric switch 38 to raise the assembly section 32 in area 18 to transport the accumulated loads 22 onto another conveyor. Furthermore, once the area 18 is full, it may be desirable to lower the assembly section 32 in the adjacent intermediate area 19 so that loads 22 can also be accumulated in area 19. This may be required to prevent the accumulated loads 22 in area 18 from being pushed off the downstream end 14 of the conveyor 10 before they are needed or "called." Heretofore, a second photoelectric switch (not shown) has been located closer to the downstream end 14 in spaced relationship to switch 38 to detect a change in position of the first load 22a and to produce a signal to activate a solenoid, such as 36a in FIG. 4, in an upstream area 19 of the conveyor 10. A change in position of load 22a has been used to indicate a "full load" condition of the area 18.

In accordance with the present invention, load separation and area accumulation of loads 22 of an accumulating live conveyor 10 are controlled by one or more motion detectors 50 for sensing motion of loads 22 which are in stopped positions on the load-carrying rollers 20 in a selected accumulating area, such as the downstream area 18 shown in FIG. 1. The motion detector 50 produces a load motion-related signal which can be used to control the operation of the conveyor 10 for load separation or upstream area accumulation of loads 22.

Figure 2:
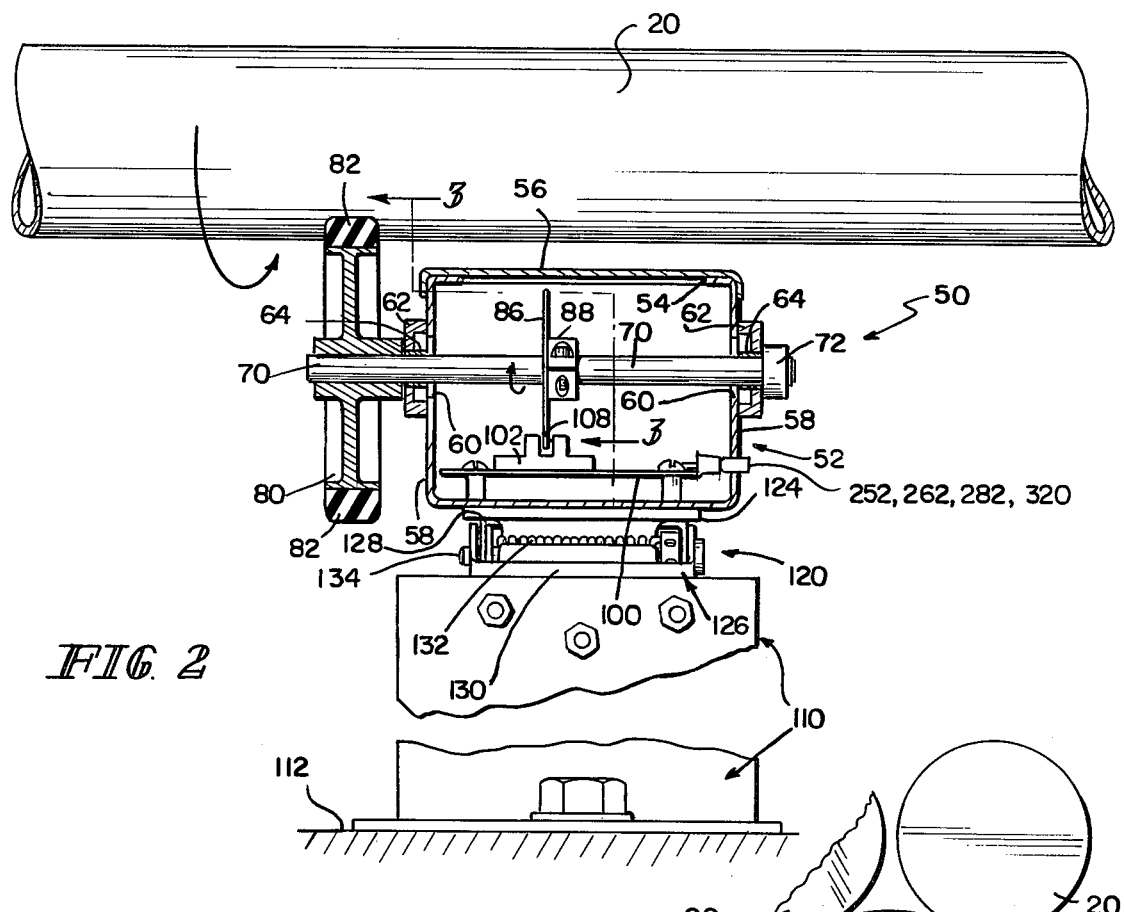
FIG. 2 is a transverse view, partly cross-sectioned and partly broken away, of a motion detector embodying the present invention.
Figure 2A:
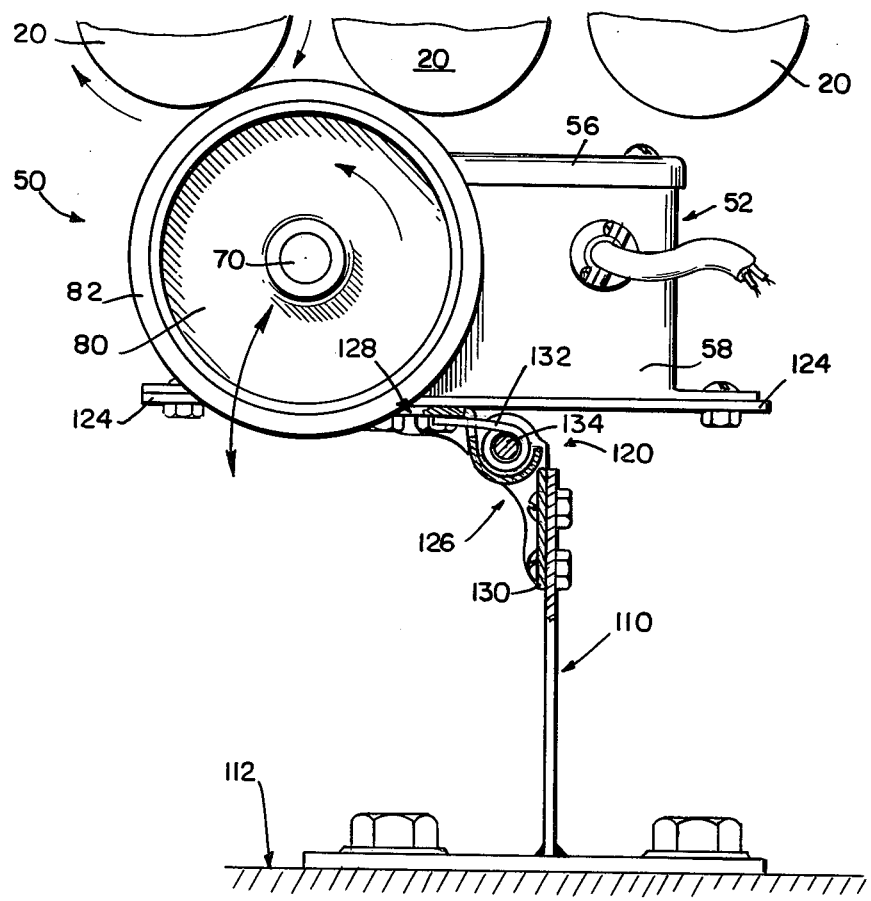
FIG. 2a is a side elevational view, partly cross-sectioned and partly broken away, of the motion detector shown in FIG. 2.

Referring to FIGS. 2 and 2a, a preferred embodiment of a motion detector 50 embodying the present invention includes a generally rectangular housing 52 having an opening 54 in the top wall for gaining access to the interior of the housing which is closed by a removable cover 56. Opposing side walls 58 of housing 52 include aligned openings 60. Flange bearings 62 are mounted to the side 58 adjacent to the openings 60. A shaft 70 is rotatably supported by bearings 62 transverse to the housing side walls 58. The flange bearings 62 each includes a bearing race 64 engaging the shaft 70.

One end of the shaft 70 includes a collar 72 to prevent axial movement of the shaft 70 relative to the housing 52. An idler wheel 80 is secured to the other end of the shaft 70 so that rotation of the idler wheel 80 results in corresponding rotation of the shaft 70. Idler wheel 80 preferably has an outer perimetral portion 82 constructed of a resilient material, such as rubber. Various wheels having the preferred features are available, and the present invention is not intended to be limited to any specific wheel.

Figure 3:
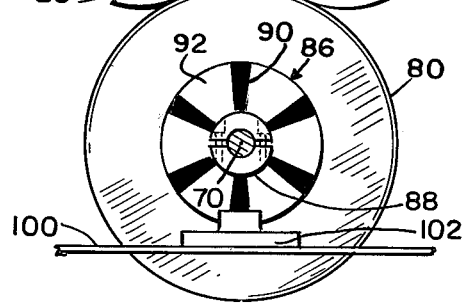
FIG. 3 is a fragmentary sectional view of the motion detector shown in FIG. 2, taken generally along section lines 3—3 of FIG. 2.

Inside the housing 52, an optical disk 86 is mounted to a collar 88 which is secured to the shaft 70 so that rotation of the shaft 70 results in corresponding rotation of the optical disk 86. As more particularly shown in FIG. 3, disk 86 is constructed of a translucent material and is coated with opaque material to form an alternating pattern of opaque segments 90 and translucent segments 92 which are equally radially spaced apart on the disk 86. The exact number of opaque and translucent segments 90 and 92, respectively, may vary for each application of the detector 50. Therefore, more or less opaque segments 90 than shown in FIG. 3 may be used without departing from the scope of the present invention.

Figure 4:
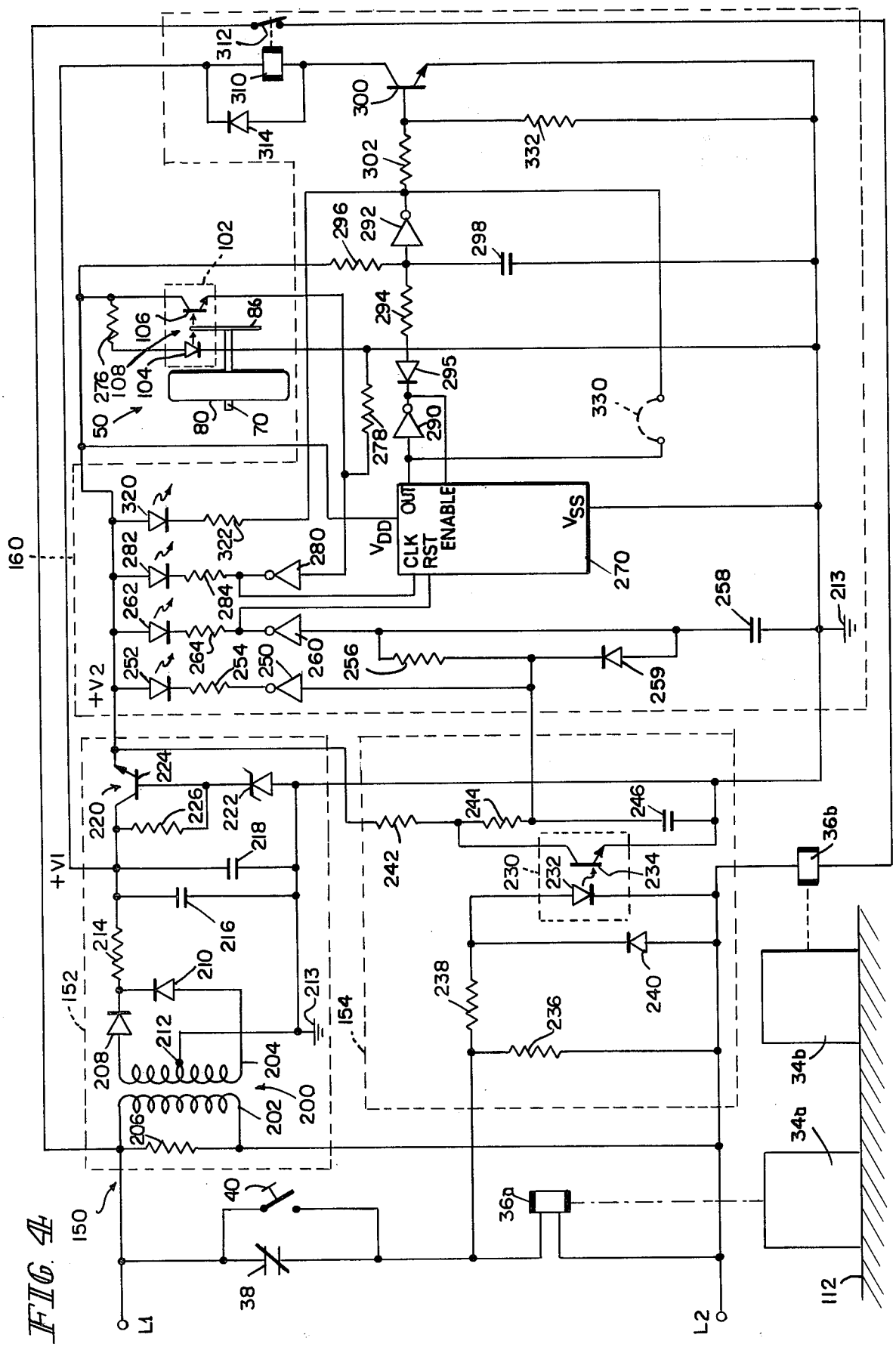
FIG. 4 is a schematic circuit diagram of a control system embodying the present invention, including at least one motion detector shown in FIG. 2 for controlling the operation of an accumulating live conveyor.

Also mounted within the housing 52 is a printed circuit board 100 which includes an electronic circuit 150, more particularly shown in FIG. 4, and a photoelectric interrupter 102. As can best be seen in FIG. 4, interrupter 102 includes a light-emitting diode transmitter 104 and a phototransistor receiver 106 with a space 108 therebetween. The interrupter 102 is positioned on the printed circuit board 100 so that, the optical disk 86 is received in the space 108 and rotates between the transmitter 104 and receiver 106 of the interrupter 102. As optical disk 86 is rotated by shaft 70, light transmission between the light-emitting diode 104 and the phototransistor 106 of interrupter 102 is periodically interrupted by the opaque segments 90 on the disk 86. Interrupter 102 may be one of many photosensitive interrupters available in the art. In the preferred embodiment, a photoelectric interrupter 102 manufactured by General Instruments and identified by the designation MCA 81 is used.

Housing 52 of the motion detector 50 is supported from the floor 112 beneath the conveyor 10 by a base member 110 so that the idler wheel 80 is continuously pressed against two load-carrying rollers 20 of the conveyor 10, as best shown in FIG. 2a. As the load-carrying rollers 20 rotate in the direction of the arrows shown in FIGS. 2 and 2a, idler wheel 80 is rotated at an angular velocity related to the angular velocity of the load-carrying rollers 20 and causes a corresponding rotation of the shaft 70 in a direction opposed to the direction of rotation of the load-carrying rollers 20, as indicated by the arrow inside the housing 52 in FIG. 2. It can be appreciated that with rotation of shaft 70 the optical disk 86 is rotated at the same angular velocity as the idler wheel 80.

Continuing to refer to FIG. 2, means 120 for yieldably mounting the housing 52 to the base member 110 includes a housing 52 mounting plate 124 secured to the bottom surface of the housing 52. Mounting plate 124 is connected to the base member 110 by a spring-loaded hinge 126. Hinge 126 includes an upper flange 128 connected to the mounting plate 124, a lower flange 130 connected to the base member 110, and a coil spring 132 engaging the upper flange to yieldably bias the mounting plate 124 upwardly as shown by the arrow in FIG. 2a. The hinge 126 pivots about a pivot point 134 so that one end of the housing-mounting plate 124 is forced upwardly to bias one end of the housing 52 toward the load-carrying rollers 20. The upward biasing of the housing 52 continuously urges the idler wheel 80 against the load-carrying rollers 20 to assure frictional contact between the load-carrying rollers 20 and the idler wheel 80. Hinge 126 may be any conventional spring-loaded hinge, and it may be connected to the mounting plate 120 and the base member 110 using conventional means such as screws.

Referring to FIG. 4, a system 150 for controlling load separation and area accumulation of loads 22 in two adjacent accumulating areas 18 and 19 of a live conveyor 10, one of which is located upstream of the other, includes a motion detector 50 positioned at the end 14 of the downstream area 18 of the conveyor 10 beneath the load-carrying rollers 20 corresponding to the location of the photoelectric switch 38, and circuit means 152, 154, and 160 responsive to the motion detector 50 and the photoelectric switch 38. The circuit means 152, 154, and 160 respond to a load position-related signal produced by the photoelectric switch 38 and the downstream solenoid 36a and process a load motion-related signal produced by the motion detector 50 to produce a control signal for controlling accumulation of loads 22 on the upstream area 19 of the conveyor 10 and for controlling "load separation" of loads 22 on the downstream area 18.

Circuit means 152 is a power supply which produces an unregulated DC voltage $+V1$ of approximately 16 volts and a regulated DC voltage $+V2$ of approximately 12 volts. The DC power supply 152 includes a voltage step-down transformer 200 for reducing the voltage across the AC power supply lines L1, L2. The primary side 202 of the transformer 200 is connected to the AC lines L1, L2, and the secondary side 204 provides an oscillating signal having a reduced voltage. Also connected to the AC lines L1, L2 is a voltage-dependent resistor 206 for suppressing surges in line voltage. The secondary side 204 of transformer 200 is coupled across a full-wave rectifier comprising a first diode 208, a second diode 210, and a center tap 212 which provides a DC reference 213. The anodes of diodes 208 and 210 are connected to the secondary side 204 of the transformer 200, and the cathodes of each diode 208, 210 are commonly connected to one side of a resistor 214. Two capacitors 216 and 218 are coupled in parallel between the other side of the resistor 214 and the DC reference 213 to filter the rectified signal and provide the unregulated DC voltage +V1.

The unregulated DC voltage +V1 is regulated by an emitter-follower regulator 220 to produce the regulated DC voltage +V2. The emitter-follower regulator 220 includes a 12 volt Zener diode 222, an NPN transistor 224, and a bias resistor 226. The anode of the Zener diode 222 is connected to the DC reference 213, and its anode is connected to the base of the transistor 224. The collector of the transistor 224 is connected to the unregulated DC voltage +V1, and the emitter of transistor 224 serves as the output for the regulated DC voltage +V2. Bias resistor 226 is connected between the collector and base of the transistor 224.

Circuit means 154 is a downstream accumulating area 18 interface circuit. Circuit 154 is connected to a junction between the normally closed photoelectric switch 38 and the solenoid 36a associated with the inflatable air bag 34a of the assembly section 32 in the downstream accumulating area 18 of the conveyor 10. Circuit 154 includes an opto-isolator device 230. The opto-isolator 230 includes a light-emitting diode 232 and a phototransistor 234 responsive to the light-emitting diode 332. A voltage-dependent resistor 236 is connected between the AC lines L1, L2 through the photoelectric switch 38 to suppress line voltage surges. Circuit 154 further includes a resistor 238 having one side connected to the AC line L1 through the photoelectric switch 38 and the other side connected to the opto-isolator device 230. A half-wave rectifier 240 comprises a diode having its anode connected to the AC line L2 and its cathode connected to the AC line L1 through resistor 238 and the photoelectric switch 38. The collector of the phototransistor 234 is connected to a RC/filter network consisting of resistors 242 and 244 and a capacitor 246 which are serially connected to the regulated DC voltage +V2. The output of circuit 154 is taken from the junction between resistor 244 and capacitor 246. During the normally closed state of photoelectric switch 38, the output of circuit 154 is low. When the photoelectric switch 38 is opened due to the position of a load 22a, solenoid 36a is deactivated and air bag 34a associated with the downstream area 18 of the conveyor 10 is deflated to place the downstream area 18 in an accumulating mode. During the open state of the photoelectric switch 38, the output of circuit 154 is high.

Circuit means 160 is an upstream accumulating area 19 control circuit. Associated with the upstream accumulating area 19 is one or more inflatable air bags 34b and one or more solenoids 36b for raising and lowering an assembly section 32 beneath the load-carrying rollers 20 in the area 19. Circuit means 160 includes a first inverter 250 having its input connected to the output of circuit 154 and its output connected to a light-emitting diode 252 through a resistor 254. Inverter 250 is one of six inverters of a CMOS hex Schmitt trigger integrated circuit package of the type manufactured by National Semiconductor Corporation and identified as MM74C914.

A second inverter 260 of the integrated circuit package also has its input connected to the output of circuit 154 through the parallel combination of a resistor 256 and a diode 259. A capacitor 258 is connected between the input of inverter 260 and the DC reference 213. Resistor 256 and capacitor 258 form an RC timing circuit and will hereinafter be referred to as the "load-coasting" timer. The output of inverter 260 is connected to a light-emitting diode 262 through resistor 264. The output of inverter 260 is also connected to the reset input (RST) of a four-stage counter 270. Counter 270 may be any four-stage counter, but in the preferred embodiment it is a four-stage counter of the type manufactured by National Semiconductor Corporation and identified by the number 4520. It should be further noted that counter 270 is not limited to a four-stage counter. In the preferred embodiment, it is only necessary that the counter have at least four stages. Use of other counters, such as, for example, an eight-stage counter, may require some slight changes in electrical connections in order for the circuit 150 to operate in the manner described later.

Referring to the motion detector 50, and more particularly to the photoelectric interrupter 102, as shown in FIG. 4, a resistor 276 is coupled between the anode of the light-emitting diode 104 and the collector of the photoelectric transistor 106. The collector of the photoelectric transistor 106 is connected to the regulated DC voltage +V2. Further, the emitter of the photoelectric transistor 106 is connected to the DC reference 213 through a resistor 278 to the input of another inverter 280 of the hex Schmitt trigger integrated circuit package. The output of inverter 280 is connected to a light-emitting diode 282 through a resistor 284. The output of inverter 280 is also connected to the clock terminal (CLK) of the counter 270. It should be noted that the counter 270 is incremented on the positive edge of the input signal at the clock terminal so that each time the output of inverter 280 goes high, the counter 270 counts one increment.

The power supply terminal ($V_{DD}$) of the counter 270 is connected to the regulated DC voltage +V2, and the reference terminal ($V_{SS}$) of the counter 270 is connected to the DC reference 213. The output terminal (OUT) of the counter 270 is connected to the input terminal of another inverter 290 of the integrated circuit package. The output of inverter 290 is connected to the enable terminal (ENABLE) of the counter 270. Connection of the enable terminal will be determined by the particular counter used and the number of increments desired to be counted. The output terminal of inverter 290 is also connected to the input of another inverter 292 of the integrated circuit package through a resistor 294 and a diode 295. The input of inverter 292 is also connected to the regulated DC voltage +V2 through a resistor 296 and to the DC reference 213 through a capacitor 298. In a manner which will be explained later, resistors 294 and 296 and capacitor 298 form an RC timing circuit which hereinafter will be referred to as the "delay timer."

The output terminal of inverter 292 is connected to the base of an NPN transistor 300 through a bias resistor 302. The output terminal of inverter 292 is also connected to a light-emitting diode 320 through a resistor 322. The emitter of transistor 300 is connected to the DC reference 213. A relay 310 is connected between the unregulated DC voltage +V1 and the collector of transistor 300. A resistor 332 is connected between the base of transistor 300 and the DC reference to provide additional biasing. Relay 310 includes a normally closed contact 312 having one side connected to the AC line L1, and the other side connected to the AC line L2 through one or more solenoids 36b which operate the inflatable air bags 34b associated with the upstream accumulating area 19 of the conveyor 10. Solenoid 36b is normally activated through relay 310 to provide a driving connection between the endless conveying means 30 and the load-carrying roller 20 in the upstream area 19.

Connected between the output terminal of the counter 270 and the output terminal of inverter 292 is an optional jumper 330 for bypassing the "delay timer." Use of the jumper 230 eliminates a time delay produced by the "delay timer," and may be used where no time delay is desired.

Operation of the motion detector 50 and the control system 150 can best be described by referring to all of the figures in combination. When conveyor 10 is initially started, the endless driving means 30 is raised in frictional contact with all of the load-carrying rollers 20 in both the downstream area 18 and an adjacent upstream area 19 by air bags 34a and 34b, respectively. Photoelectric switch 38 is normally closed so that solenoid 36a is activated and air bags 34a are inflated to press the endless driving means 30 against the load-carrying rollers 20 in the downstream area 18. Further, the normally closed contacts 312 of relay 310 activate solenoid 36b to inflate air bags 34b and press the endless driving means 30 against the load-carrying rollers 20 in the adjacent upstream area 19. The leading or first load 22a is placed on the conveyor 10 at the upstream end 12 and transported over the load-carrying rollers 20 in the upstream area 19 and downstream area 18. When the leading load 22a reaches a position in the downstream area 18 in front of the photoelectric switch 38, the switch is opened to deactivate solenoid 36a and remove driving engagement between the endless conveying means 30 and the load-carrying rollers 20 in the downstream area 18 of the conveyor 10. The downstream area 18 is thereby placed in an accumulation mode of operation, and the leading load 22a is stopped at a position in proximity to the downstream end 14 of the conveyor 10.

As long as there is no load 22 in front of the photoelectric switch 38, it remains closed and the output of circuit 154 is low. When the photoelectric switch 38 opens in response to the position of the leading load 22a, the output of circuit 154 goes high. A high signal at the input terminal of inverter 250 turns on the light-emitting diode 252 to provide a visual indication that the downstream area 18 of the conveyor 10 is in an accumulating mode of operation.

For a short period of time after the downstream area 18 of the conveyor 19 is placed in an accumulating mode, the leading load 22a will coast over the disengaged load-carrying rollers 20. In order to assure that the leading load 22a has stopped before counter 270 is enabled to start counting signals related to the motion of the leading load 22a, a 2 to 3 second time delay is provided by the "load-coasting timer." In response to a high output of circuit 154, capacitor 258 begins to charge. When the threshold voltage of inverter 260 is reached (approximately 6 volts), its output goes low to turn on diode 262 and enable counter 270. Diode 262 provides a visual indication that system 150 is set in a load motion-sensing mode of operation. When a low signal is provided at the reset terminal (RST) of counter 270, a low signal is produced at its output terminal (OUT), and a high signal is produced at the output terminal of inverter 290. The high signal at the output terminal of inverter 290 is returned to the enable terminal (ENABLE) of counter 270 to latch the counter in a counting mode. The "load-coasting timer" should provide a delay sufficient to allow the leading load 22a to stop coasting before counter 270 is set to respond to the motion of the load detected by detector 50. It can be appreciated that the values of capacitor 258 and resistor 256 should be chosen to provide a time interval which is greater than the time it takes for the leading load 22a to coast to a stop after the downstream area 18 is placed into an accumulation mode of operation.

As loads 22 are continuously pushed into the downstream area 18 of the conveyor 10, the area 18 will eventually be filled with loads 22, as best shown in FIG. 1. When area 18 is full, the leading load 22a will be pushed into motion by additional loads as they are conveyed downstream on the conveyor 10. Motion of load 22a is detected by motion detector 50. Each time the light path between the light-emitting diode 140 and the photoelectric transistor 106 is interrupted by rotation of the optical disk 86, a low signal is produced which is related to the motion of the leading load 22a. This motion-related signal appears at the input terminal of inverter 280, and a high inverter output is produced. As each opaque segment 90 of the disk 86 interrupts the light transmission, a motion-related signal is produced. Light-emitting diode 282 blinks off and on as each motion-related signal is produced. Since the output terminal of inverter 280 is connected to the clock terminal (CLK) of counter 270, it is incremented by one count on each positive edge of the output of inverter 280.

As soon as counter 280 counts four motion-related signals, the output terminal (OUT) of counter 270 goes high. A count of four motion-related signals is required so that inadvertent movement of the load 22a will not trigger a false indication of a "full" downstream area 18.

When the output terminal (OUT) of counter 270 is high, transistor 300 is turned on through inverters 290 and 292. Further, the output of inverter 290 goes low. The low output of inverter 290 is fed back to the enable terminal (ENABLE) of the counter 270 to disable the counter 270. When transistor 300 is turned on, relay 310 is activated to open contacts 312. When contact 312 is opened, solenoid 36b, which controls the air bag 34b in the upstream area 19, is deactivated. Deactivation of solenoid 36b places upstream area 19 in an accumulating mode of operation so that loads 22 are stopped in area 19 to prevent further pushing of the loads 22 in the downstream area 18. By disabling the counter 270, the upstream area 19 is latched in an accumulation mode of operation. The output of inverter 292 is used to turn on light-emitting diode 320 to provide a visual indication that the upstream area 19 is in an accumulation mode of operation.

While system 150 is shown and described for controlling a downstream area 18 and one adjacent upstream area 19 of the conveyor 10, it should be understood that other upstream areas 16 of the conveyor 10 may be controlled by using additional motion detectors 50 in an arrangement such as that shown in FIG. 1. According to the present invention, a number N of accumulating areas 16, 18, and 19 of a conveyor 10 can be controlled by using a single photoelectric eye positioned in proximity to the downstream end 14 of the conveyor 10 and a number equal to N−1 motion detectors 50 positioned in proximity to the ends of each area 18 and 19 excluding the first upstream area 16. As each area is placed in an accumulation mode and then filled with loads 22, the next upstream area will be automatically placed into an accumulation mode until the complete conveyor 10 is filled.

Once counter 270 is disabled, it can only be reset when the leading load 22a is "called" or removed from the downstream area 18. Leading load 22a can be "called" by depressing the load-call switch 40 which bypasses photoelectric switch 38 to activate solenoid 36a so that the load-carrying rollers 20 in downstream area 18 are driven. As soon as solenoid 36a is activated, the output of circuit 154 goes low, and capacitor 258 rapidly discharges through diode 259 and resistor 244, producing a high signal at the reset terminal (RST) of counter 270. As long as the reset terminal (RST) is high, the output terminal (OUT) of counter 270 is low and the output terminal of inverter 290 is high. When the output of inverter 290 goes high, capacitor 298 begins to charge slowly through resistor 296. As soon as the voltage across capacitor 298 equals the threshold voltage of inverter 292 (approximately 6 volts), the output terminal of inverter 292 goes low, thereby turning off transistor 300 and deactivating relay 310. Deactivation of relay 310 closes contacts 312 to energize solenoid 36b so that the load-carrying rollers 20 in the upstream area 19 are now driven. When the leading load 229 is "called," the "delay timer" provides a time delay before the upstream area 19 is returned to a non-accumulating or driven mode of operation. By connecting the jumper 330, this time delay can be eliminated so that the upstream area 19 is returned to a driven mode of operation coincidently with the downstream area 18 when the leading load 22a is called.

What is claimed is:

1. A system for controlling the operation of an accumulating live conveyor of the type including a plurality of load-carrying rollers supported for rotation about transverse axes, driving means for conveying loads over the load-carrying rollers from an upstream end toward a downstream end of the conveyor, and accumulating means for removing driving engagement of the driving means in selected areas of the conveyor to accumulate loads in such areas, the system comprising position detecting means for detecting a position of a load in a downstream area of the conveyor, first signal means responsive to the detecting means producing a load position-related signal, means for actuating the accumulating means in response to the load position-related signal to stop the load at about the detected position in the downstream area of the conveyor, an idler wheel, means for rotatably supporting the idler wheel in engagement with at least one load-carrying roller in proximity to the detected position of the load, the idler wheel being rotated in response to movement of the load to sense motion of the load, second signal means for producing a load motion-related signal in response to rotation of the idler wheel, the load motion-related signal including a periodic pulse, a series of such periodic pulses corresponding to motion of the load, signal processing means responsive to the load position-related signal for processing the load motion-related signal and for producing a control signal for controlling the operation of the conveyor, the signal processing means including means for counting periodic pulses produced by the second signal means, the counting means including a reset terminal, and means coupling the first signal means to the reset terminal whereby the counting means is reset in response to the load position-related signal, the coupling means including delay timing means for delaying the start of the counting means.

2. The system of claim 1 wherein the counting means includes a clock terminal and an output terminal.

3. The system of the claim 2 further comprising coupling means between the second signal means and the clock terminal of the counting means whereby the counting means counts periodic pulses produced by the second signal means when the counting means is reset in response to the load position-related signal.

4. The system of claim 3 wherein the actuating means includes a bidirectional switching device and coupling means between the bidirectional switching device and the output terminal of the counting means.

5. The system of claim 4 wherein the output terminal is initially a first state and switches to a second state when the counting means has counted a predetermined number of periodic pulses, the bidirectional switching device having a normally closed state when the output terminal is in its first state and an open state when the output terminal is in its second state.

6. The system of claim 5 further comprising coupling means between the bidirectional switching device and the accumulating means, the accumulating means being actuated in response to the open state of the bidirectional switching device to remove driving engagement of the driving means in an upstream area of the conveyor.

7. The system of claim 6 wherein the coupling means between the output terminal of the counting means and the bidirectional switching device includes a second delay timing means for delaying the switching of bidirectional switching device to its closed state when the output terminal is returned to its first state, thereby to delay the driving engagement of the driving means in the upstream area when the counting means is reset.

8. The system of claim 7 wherein the means for rotatably supporting the idler wheel includes biasing means for urging the idler wheel into engagement with the load carrying roller.

9. The system of claim 8 wherein the second signal means includes a translucent disk coupled to the idler wheel and a photoelectric interrupter, the disk having a radial series of opaque segments for periodically interrupting the photoelectric interrupter in response to rotation of the idler wheel to produce the series of periodic signals.

10. The system of claim 1 further comprising coupling means between the signal processing means and the accmlating means in an upstream area of the conveyor, the accumulating means in the upstream area being actuated in response to the control signal to remove driving engagement of the driving means in the upstream area of the conveyor.

11. The system of claim 10 comprising at most one position detecting means located in proximity to the downstream end of the conveyor and a number N−1 of motion sensing means for producing load-motion related signals to control a predetermined number N of downstream, upstream and intermediate areas of the conveyor.

* * * * *